United States Patent
Carlei

(10) Patent No.: US 7,997,845 B2
(45) Date of Patent: Aug. 16, 2011

(54) GLASS HANDLING SYSTEMS

(75) Inventor: Ricardo Carlei, Essendon (AU)

(73) Assignee: Quantum Workhealth Programmes Pty, Ltd., Essendon, Victoria (AU)

( * ) Notice: Subject to any disclaimer, the term of this patent is extended or adjusted under 35 U.S.C. 154(b) by 995 days.

(21) Appl. No.: 11/579,565

(22) PCT Filed: May 5, 2004

(86) PCT No.: PCT/AU2005/000644
§ 371 (c)(1),
(2), (4) Date: Aug. 24, 2007

(87) PCT Pub. No.: WO2005/105541
PCT Pub. Date: Nov. 10, 2005

(65) Prior Publication Data
US 2008/0150244 A1 Jun. 26, 2008

(30) Foreign Application Priority Data

May 5, 2004 (AU) ................................ 2004902390
Sep. 7, 2004 (AU) ................................ 2004905121

(51) Int. Cl.
*E04G 21/14* (2006.01)

(52) U.S. Cl. ........... 414/10; 414/590; 414/679; 414/917

(58) Field of Classification Search .................. 414/541, 414/10–12, 629, 632, 589, 590, 917; 211/41.1, 211/41.14; 280/35; 52/127.2, 645, 745.2
See application file for complete search history.

(56) References Cited

U.S. PATENT DOCUMENTS

| | | | | |
|---|---|---|---|---|
| 2,536,239 A * | 1/1951 | Tyndall | ........................ | 269/70 |
| 3,051,331 A * | 8/1962 | Schram | ........................ | 414/444 |
| 3,138,265 A * | 6/1964 | Hansen | ........................ | 414/428 |
| 3,361,280 A * | 1/1968 | Traver | ........................ | 414/627 |
| 3,643,935 A * | 2/1972 | Bell | ........................ | 269/16 |
| 3,765,550 A * | 10/1973 | Tausheck | ........................ | 414/541 |
| 3,923,167 A * | 12/1975 | Blankenbeckler | ........................ | 414/11 |
| 4,239,197 A * | 12/1980 | Olstad | ........................ | 269/68 |
| 4,676,713 A * | 6/1987 | Voelpel | ........................ | 414/590 |
| 4,884,938 A * | 12/1989 | Fujita et al. | ........................ | 414/541 |
| 2001/0052708 A1 | 12/2001 | Schmalz et al. | | |

FOREIGN PATENT DOCUMENTS

| | | |
|---|---|---|
| GB | 2360504 A | 9/2001 |
| SU | 562464 | 9/1977 |
| WO | WO 2004/005106 A1 | 1/2004 |

OTHER PUBLICATIONS

Ace Dolly Data Sheet, date uknown.

* cited by examiner

*Primary Examiner* — Joshua I Rudawitz
(74) *Attorney, Agent, or Firm* — Knobbe Martens Olson & Bear LLP

(57) ABSTRACT

A sheet handling device for handling large sheets of glass or other sheet material, the device comprising a wheeled trolley having an upright support shaft (2), a carriage movable along the shaft (2) into a selected position, and at least two vacuum grips mounted to the carriage to engage the sheet at positions displaced in the height direction of the sheet. In another embodiment the carriage is movable by operation of a winch. The trolley is normally used in conjunction with a second like trolley so that the vacuum grips of the two trolleys engage the sheet at spaced positions along the length of the sheet. The two trolleys are preferably interconnected by releasable bracing which can be stored on the trolleys for ease of transportation. In a further embodiment there is also disclosed a glass installation guide to facilitate guidance of a large glass sheet into a frame during installation.

18 Claims, 14 Drawing Sheets

GLASS HANDLING SYSTEMS

The present invention relates to systems for handling sheets of glass or other sheets of relatively rigid and relatively smooth materials such as metal, marble or plasterboard.

In our International patent application PCT/AU03/00882, the disclosure of which is hereby incorporated by reference, there is proposed a sheet handling device in the form of a wheeled trolley for handling glass or other sheet material having vacuum grips which are height-adjustable along an upright support shaft forming part of the trolley (herein referred to as "a device of the type described"). In one preferred construction, the height adjustment along the upright support shaft is effected by means of a winch built into the trolley. The principal version of the trolley disclosed in our earlier application is intended for use with a second like trolley for transporting and maneuvering relatively large sheets of glass and other material.

The present invention concerns modifications or improvements in the design of the trolley principally to provide greater versatility over a range of possible uses.

Broadly speaking, the present invention in one aspect can be said to comprise a sheet handling device of the type described having one or more of the following features:

two or more vacuum grips mounted on a common carriage for movement along the upright support shaft of the trolley;

one or more pairs of vacuum grips mounted for swinging movement about an axis transverse to the axis of the upright support shaft of the trolley by which the grips are carried;

an emergency brake system associated with a winch-driven vacuum grip carriage for braking the carriage against the upright support shaft in the event of winch or cable failure—the brake may operate in response to loss in cable tension;

pivotal mounting of the upright support shaft within the trolley for movement between a vertical and an inclined position;

a trolley defined by a single upright support shaft pivotally mounted at its lower end to a base—the base may be foldable to lie alongside the shaft for storage purposes;

one or more pairs of vacuum grips mounted for rotational movement whereby to change the orientation of the sheet carried thereby;

a pair of trolleys interconnected by a horizontal bar slidable along the upright support shafts of the trolleys and vacuum grips carried by the bar and adjustable lengthwise along the bar;

an extendable/retractable sheet support at an upper end of the upright support shaft of the trolley;

adjustable bracing for releasably coupling two trolleys;

vacuum grips mounted to the trolley for universal pivotal movement relative to the trolley;

a winch-driven vacuum grip carriage releasably detachable from the trolley whereby the carriage is freely suspended by the winch cable to facilitate manipulation of the sheet during installation;

vacuum grips supported from the trolley via a lever arm which can be pivoted to provide vertical movement of the vacuum grips relative to the trolley;

trolleys interconnected by bracing for use in a factory situation—one or more of the trolley wheels may be motor-driven; and the use of support brackets rather than vacuum grips to facilitate transportation of a stack of sheets.

A sheet handling system consisting of two trolleys of the type described for transporting a large sheet of glass can be used to manoeuvre the sheet for installation into a frame. Even with a large glass sheet, installation can be accomplished by only two people in contrast to perhaps five or six people sometimes required when installing large glass sheets using more traditional installation techniques. In addition to the people needed to manipulate the glass into the frame from the outside during installation, it is sometimes necessary to have a person working from the inside of the frame to prevent the glass sheet from being pushed through the frame during installation. Another aspect of the invention concerns a glass installation guide which can be used to obviate the need for a person to work from the inside during installation. When these guides are used in conjunction with the glass handling system of the first aspect of the invention significant savings in personnel can be achieved.

Accordingly, in another aspect of the invention there is provided a glass installation guide comprising a guide plate for clamping against the inside face of a glass-receiving channel in a frame for engagement with the surface of the glass sheet to facilitate its manipulation into the channel.

In a preferred form, the installation guide has a second plate parallel to the guide plate and adapted to lie at the inside of the frame, the second plate carrying at least one clamp, such as a clamping screw, for clamping engagement with an internal face of the frame in order to draw the guide plate against the inside face of the channel.

In a typical installation situation, one such guide will be mounted at each of the corner portions of the frame and possibly also at an intermediate position along each of the uprights and horizontal members of the frame.

Embodiments of the invention will now be described by way of example only with reference to the accompanying drawings in which.

The following description initially details a range of improvements/modifications in terms of a single trolley of the type described in our earlier International patent application.

While just a single trolley is discussed, it is to be understood that in most practical applications that single trolley will be used in conjunction with a second like trolley in the manner described in our earlier application so that the sheet of glass or other material spans the two trolleys and is carried thereby.

Figure 1:
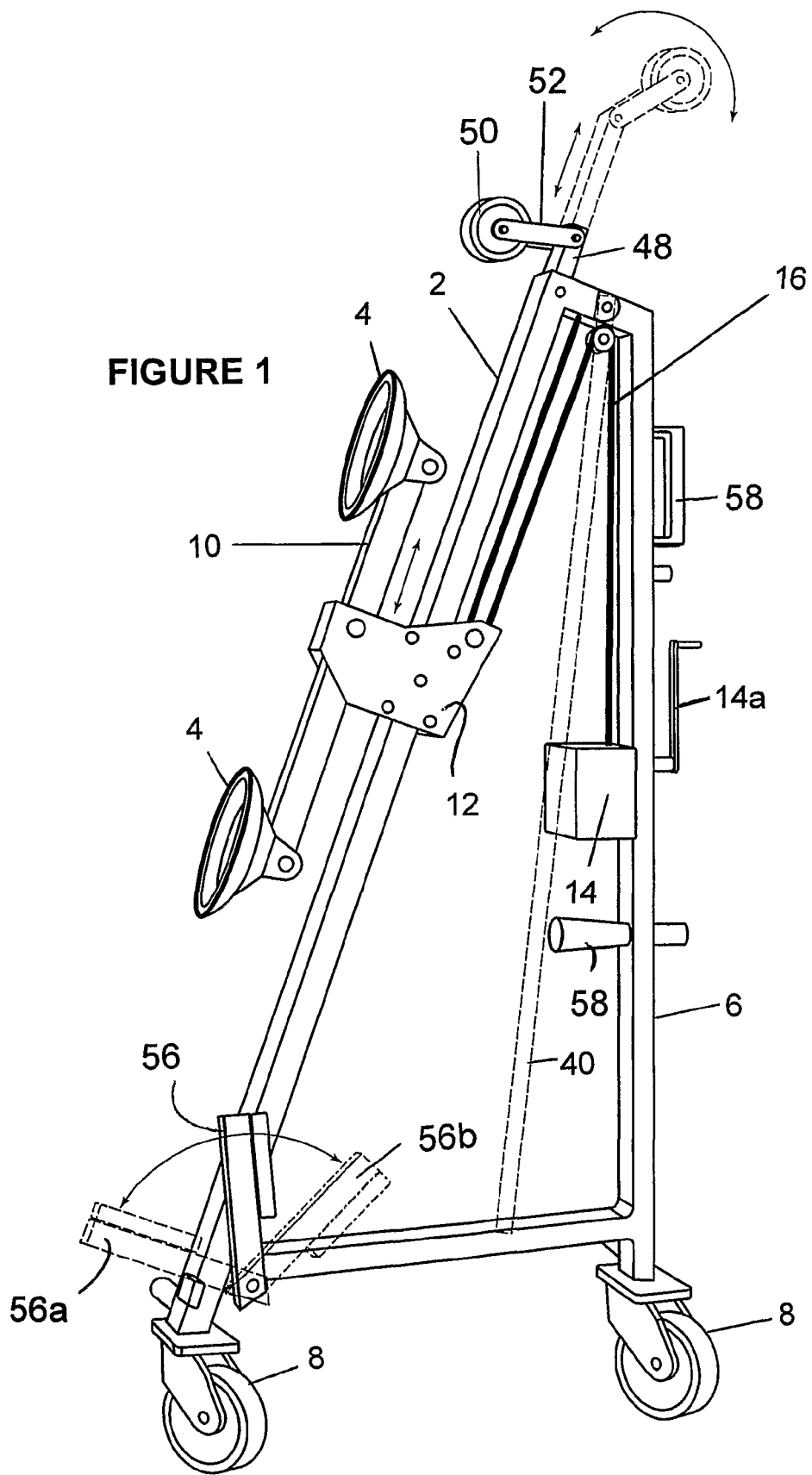
FIG. 1 is a perspective view of a trolley in accordance with a preferred embodiment of the invention.

FIG. 1 shows a trolley in the form of a generally triangular frame having at its front a rearwardly-inclined upright support shaft 2 along which vacuum grips 4 are moveable, and a rear substantially vertical shaft 6. A castor wheel 8 is mounted at the lower end of the shafts 2, 6. The two vacuum grips 4 are at opposite ends of an arm 10 which is mounted to a carriage 12 moveable along the shaft 2 under the control of a winch 14 mounted to the rear shaft 6, with the winch cable 16 passing from the winch upwardly over one or more pulleys at the top of the trolley and then downwardly parallel to the front shaft 2 to be coupled with the carriage 12.

The winch itself may be hand-driven (as shown, by winch handle 14a) or motor driven. As an alternative to a motor-driven winch, the cable may be carried by a motor driven cable reel, with the cable path being otherwise as described for the winch system.

Figure 2:
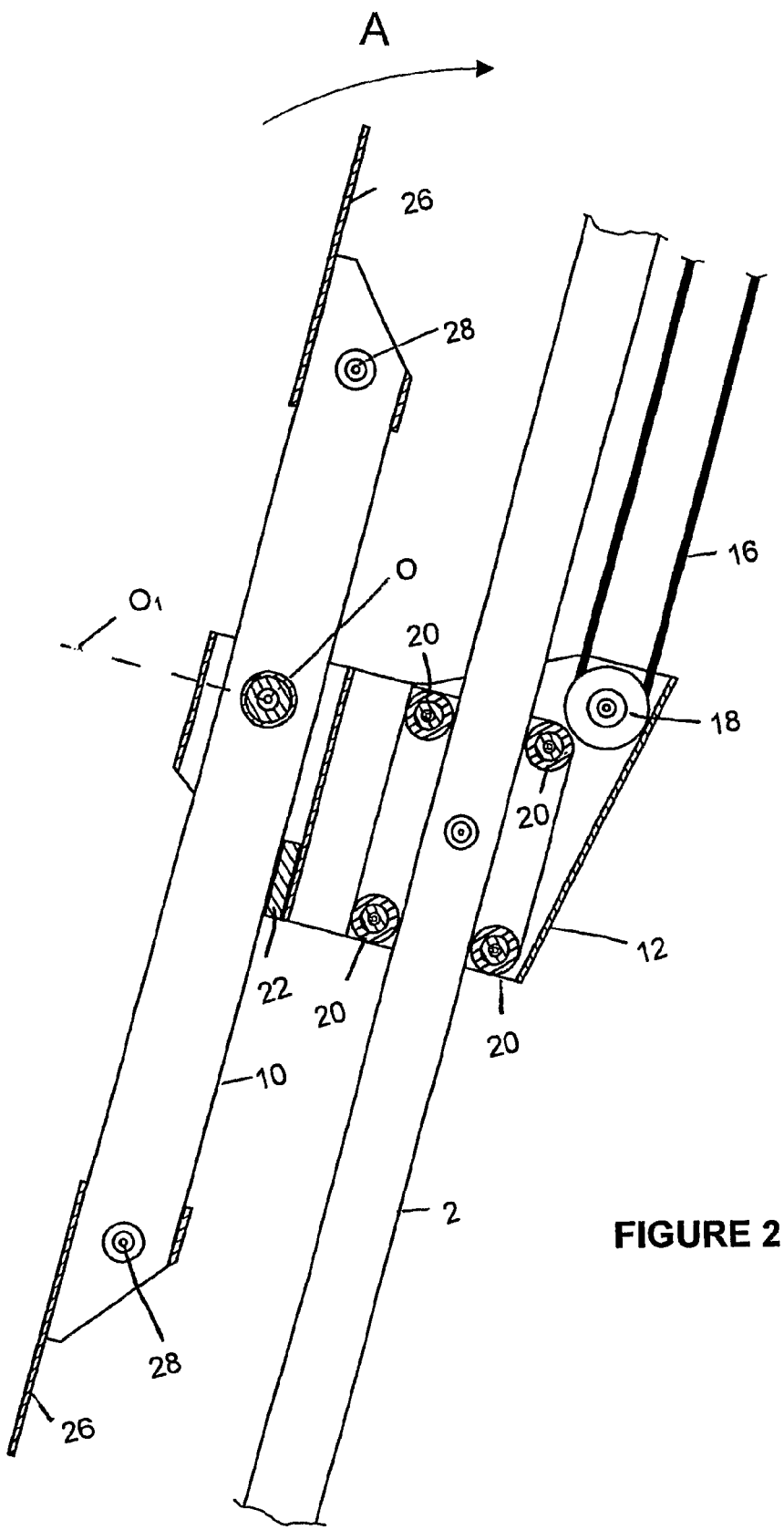
FIGS. 2 and 3 are cross-sections showing details of a carriage and associated arm by which the vacuum grips are mounted to the upright support shaft of the trolley.

The detailed construction of the carriage 12 is shown in FIG. 2. The carriage 12 includes a cable pulley 18 around which the cable 16 from the winch passes, the free end of the cable then passing upwardly from the pulley 18 to be fastened to a suitable anchorage adjacent the upper end of the front shaft 2. The carriage 12 is mounted to the front shaft 2 by rollers 20. The cable pulley 18 may be associated with a carriage brake which locks against the front shaft in the absence of tension in the winch cable to prevent accidental lowering of the carriage should the cable brake or become disconnected. Normally, however, the brake is maintained in an inactive state as a result of the tension in the cable. It is however to be understood that such a brake is not essential and indeed is unnecessary in many practical forms of the invention, but may be incorporated if required.

Figure 3:
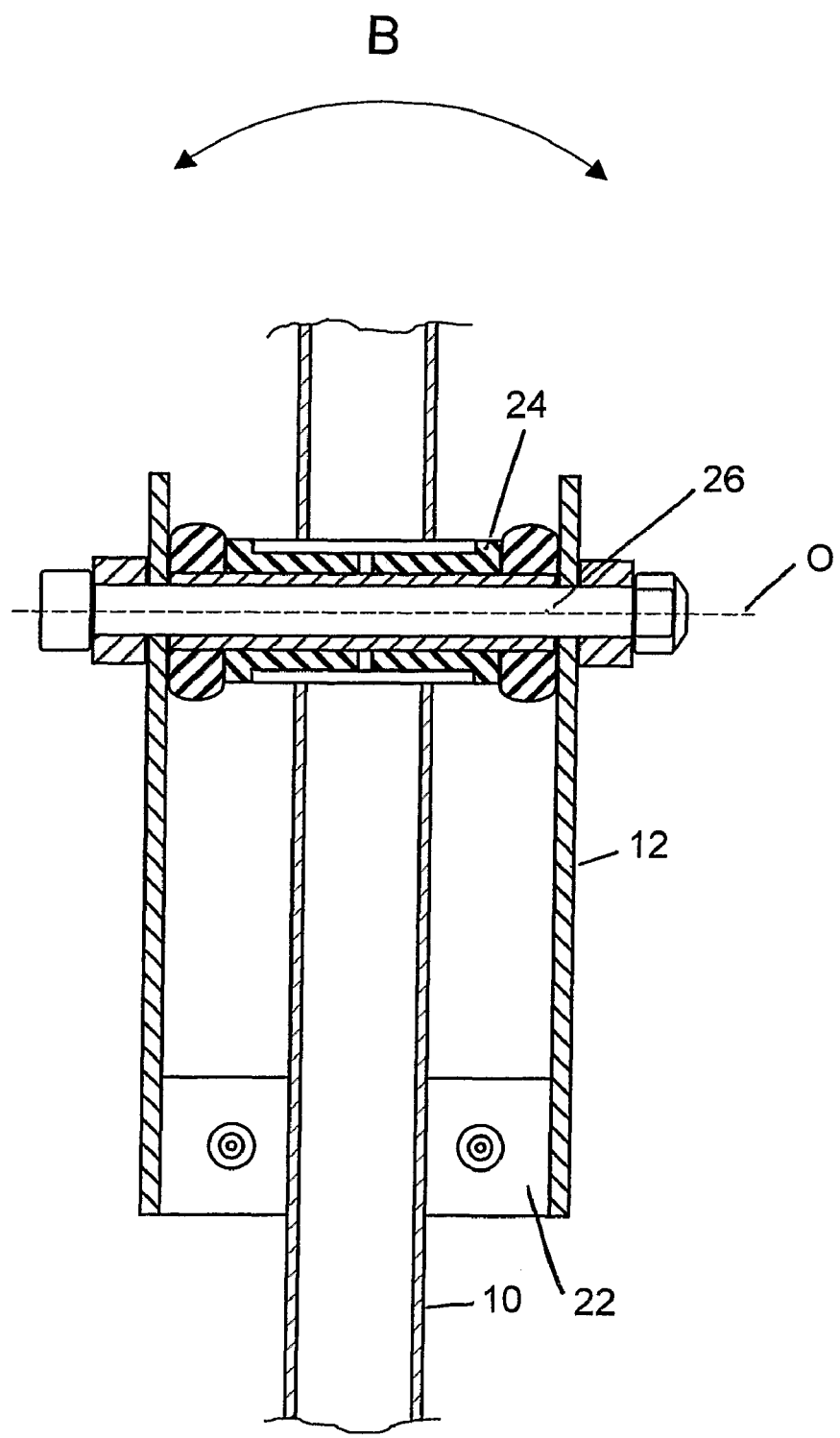

With reference to FIG. 2 and also to FIG. 3, the grip arm 10 is mounted to the carriage 12 for pivotal movement about an axis O for movement through a limited angle in a fore-aft direction as indicated by the arrow A in FIG. 2. This is desirable to permit a degree of self adjustment particularly when the trolley is being moved over relatively uneven ground, as will be later described. In its stable condition of use, the arm 10 will be held parallel to the front support shaft 2 by engagement with a resilient bearing pad 22. The grip arm 10 is also mounted for swinging movement about an axis $O_1$ perpendicular to the axis O and thus perpendicular to the plane of the sheet carried by the trolley; this swinging movement is indicated by the arrow B in FIG. 3. In the particular embodiment shown this swinging movement is through a relatively restricted angle. With specific reference to FIG. 3, the arm 10 is mounted via flexible bushes 24 on a pivot shaft 26 the axis of which defines the pivot axis O. The flexibility of the bushes 24 enables the swinging movement about the axis $O_1$.

While this restricted swinging movement about axis $O_1$ is sufficient for purposes subsequently to be described, in alternative arrangements the grip arm 10 may be mounted for somewhat more extensive swinging movement about the axis $O_1$.

The grip arm 10 carries at each end a mounting plate 26 to which the respective vacuum grips 4 (not shown in FIG. 2) are attached. Preferably, the two mounting plates 26 are each attached to the arm 10 by a pivot mounting 28 which permit limited pivotal movement of the plate 26 and hence of the vacuum grip carried thereby about an axis parallel to the axis O.

As previously mentioned, the trolley just described is normally used in conjunction with a second like trolley so that the sheet of glass or other material spans the two trolleys and is carried by the sets of grips of the two trolleys. It is particularly preferred that the two trolleys are coupled by bracing in order to provide greater rigidity and stability.

Figure 4:
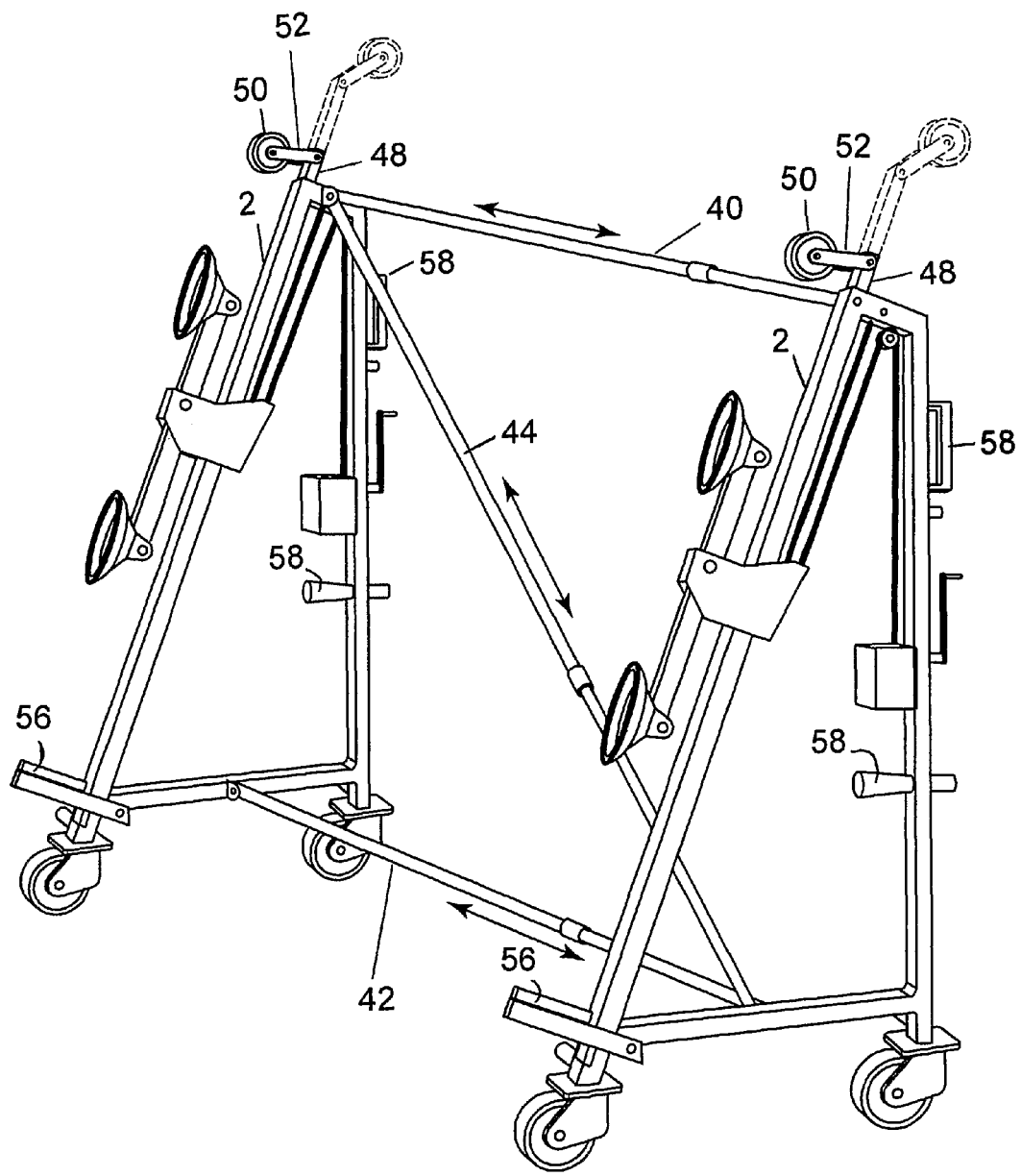
FIG. 4 is a perspective view showing two trolleys of the type shown in FIG. 1 interconnected by adjustable bracing.

As shown in FIG. 4, the bracing is of Z-form and consists of an upper brace 40 pivotally attached at one end to one of the trolleys, a lower brace 42 pivotally attached at one end to the other trolley, and a diagonal brace 44 pivotally attached at one end to one or other of the trolleys. Each brace 40, 42, 44 is of telescopic construction so as to be adjustable in length and can be locked to a selected length by a suitable clamp, for example using an over-centre or toggle type action. The individual braces are swung from stowed positions on the respective trolleys (shown schematically in FIG. 1 for the brace 40) into an operative position for connection to the other trolley, the length of the brace is adjusted to suit the particular set-up, and then the brace is secured to the other trolley preferably by a releasable pivotal connection (to permit the action described in the following paragraph) and locked in its extended length.

It is particularly preferred that the diagonal brace 44 has facility for fine adjustment of its length while in situ. This can be achieved by forming one of the two telescopic sections of the brace in two parts interconnected by a left hand and right hand threaded coupling so that by rotating the coupling in one direction the effective length of that section and hence of the overall brace can be extended in a gradual fashion. By extending the length of the diagonal brace in this manner while a sheet is held by the vacuum grips of the two trolleys, the assembly of the two trolleys and bracing can be "lozenged" to provide a fine-controlled horizontal displacement of the sheet in its own plane relative to the wheels of the trolleys in order to facilitate accurate lateral movement of the sheet during installation into one side of a frame. The fine-control is achieved by rotating the coupling until the required lateral displacement has been achieved. This effect is shown schematically in FIG. 5.

Figure 5:
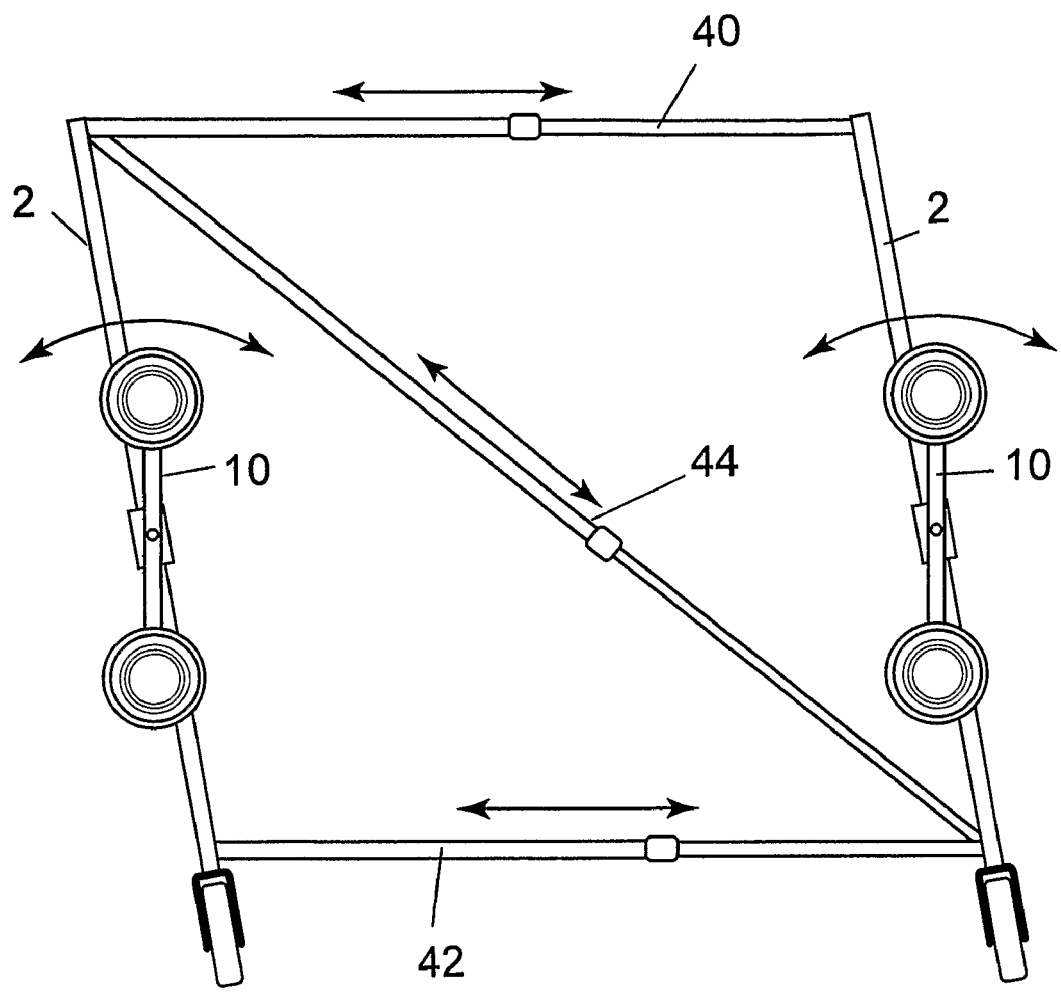
FIG. 5 is a schematic front view of the trolley and bracing configuration shown in FIG. 4 to illustrate how adjustment in the length of the diagonal brace can be used to tilt the two trolleys to permit some lateral displacement of the sheet during installation.

It will be understood with reference to FIGS. 4 and 5 that when this lozenging takes place there is pivotal movement between each trolley and its grip arm 10 about axis $O_1$ so that the grip arm remains vertical and the trolley is inclined to one side. However the relative inclination between the grip arm and trolley is not significant and is able to be accommodated by the resilience of the flexible bushes 24.

Although it is preferred that the bracing is of adjustable length in order to provide versatility in use, nevertheless in alternative arrangements the bracing can be of fixed length to provide a fixed spacing between the two trolleys although even in that arrangement the diagonal brace can, to advantage, incorporate the facility for the fine length adjustment to provide the lozenging affect just described.

In a modified version, the grip arm 10 may be mounted to the carriage 12 for swinging movement about the axis $O_1$ so that the arm 10 can pivot to any selected angular orientation. The arm 10 is releasably lockable to the carriage 12 in its vertical orientation (the orientation shown in FIG. 1) and when the lock is released the arm 10 is able to be swung about the axis $O_1$. This swinging movement of the arm 10 and hence of the vacuum grips 4 enables the orientation of the glass carried by two such trolleys to be adjusted to a level position when the two trolleys are on sloping ground. In this respect, if the two trolleys are on sloping ground with one trolley at a higher level than the other and it is required to move the sheet carried thereby into a horizontal orientation, for example for installation purposes, the locks holding the grip arms 10 on the two trolleys are released, and one set of grips is then displaced upwardly or downwardly along the associated trolley shaft 2 in order to bring the sheet into a horizontal orientation. This is enabled by swinging movement of the two pairs of grip arms relative to their associated carriages with the lateral distance between the two trolleys automatically changing to accommodate the swinging movement of the glass sheet which takes place relative to the two trolleys. It is likely that when used in this mode, the bracing would not be coupled between the trolleys. While, to an extent this effect can also be achieved with the mounting shown in FIGS. 2 and 3, the degree of swinging movement which is permitted in that version is more limited.

The range of movements described above provide for tilting movement of the grip arm through a limited extent in all directions. Accordingly, if the two trolleys carrying a sheet of glass 10 move out of alignment during transportation as may occur when moving over uneven ground, each arm and the grips carried thereby will tend to self-adjust to conform to the general planarity of the sheet to thereby avoid inducing a twist in the sheet and which, if the sheet is relatively thin might, in some circumstances, cause cracking of the sheet under the induced twist.

In a further modified version, the arm 10 is mounted to the carriage by a universal swivel joint which permits pivotal movement of the arm 12 in all directions to accommodate the various forms of adjustment previously described.

Preferably, as shown in FIGS. 1 and 4 the trolley has at the upper end of the front shaft 2, a telescopic extension 48 slidable in the front shaft 2 between a contracted position (as shown in solid lines) and an extended position (shown in broken lines). The extension 48 can be held in its extended position either by friction forces or by a clamping screw carried by the front shaft 2. The extension 48 carries a support 50 for engaging an upper part of the sheet to prevent excessive flexing of the sheet when particularly large sheets (in a height direction) are being carried. The support 50 preferably is in the form of a roller which is mounted on an arm 52 pivoted to the extension for swinging movement between an operative position in which the roller 50 projects forwardly to engage the rear face of the sheet (this is the position shown in solid lines) and an inoperative position in which it extends rearwardly (as shown in broken lines).

A sheet support 56 is provided at the lower end of the front shaft 2, the support 56 being pivotal between an extended forward position 56a (see FIG. 1) and a stowed position shown at 56b. In its extended position, the support 56 is able to carry the weight of the sheet. For added safety during transportation, when the sheet has been attached to the vacuum grips 4, the grips 4 can be lowered downwardly along the front shaft 2 by operation of the winch to bring the lower edge of the sheet into contact with the support 56 to provide added security in the event of failure of the winch system or vacuum grips.

The rear shaft 6 of the trolley carries one or more handles 58 for maneuvering the trolley, for example for steering the trolley or lifting the trolley for example during passage over rough or bumpy surfaces. The trolley may also include a foot bar (not shown) mounted to the rear shaft 6 at its lower end for pivotal movement between an operative position in which it extends laterally from the frame and a stored position. If the trolley is tilted forwardly about its front wheel 8 to orientate the front shaft 2 vertically for loading the sheet onto the trolley or for installation of the sheet into a frame, foot pressure can then be applied to the foot bar to easily swing the trolley back.

The mounting system for the grip arm 10 shown in FIGS. 2 and 3 will provide a degree of shock-absorbance between the trolley and the sheet carried thereby when the trolley is moving along rough ground. Further shock absorbance can be achieved if the two castor wheels 8 are themselves mounted to the trolley frame via shock absorbing mountings.

For installation of the glass into a frame the glass needs to be orientated into a vertical position and this is achieved by tipping the trolleys forwardly on their front wheels, and the glass sheet can be moved into accurate alignment with the frame by maneuvering the trolleys and adjusting the height of the sheet by operation of the winches. Carefully controlled lateral movement to introduce a side edge of the sheet into a channel at the side of the frame can be achieved by rotating the threaded coupling to extend the length of the diagonal brace to provide the "lozenging" effect previously described. During some of the manipulation required to install the sheet within the frame it may be desirable for the trolley itself to be held in a fixed position and for this purpose it is preferred that the front wheel 8 of the trolley is able to be locked against rotation when required; a foot-activated lock can be installed for this purpose.

In another modification to facilitate further manipulation of the sheet during installation, the grip arms 10 are mounted to the carriages 12 by a screw system which is rotatable to permit the grip arm 10, and thereby the sheet held by the vacuum grips 4, to be displaced forwardly relative to the front shaft 2 of the trolley during installation, that is forwardly in the direction of axis $O_1$. The screw mounting will be hand-driven by a handle projecting from the carriage 12 to permit easy operation by an operator standing in the vicinity of the trolley. Relatively fine and accurate adjustment can be achieved in this way.

Figure 6:
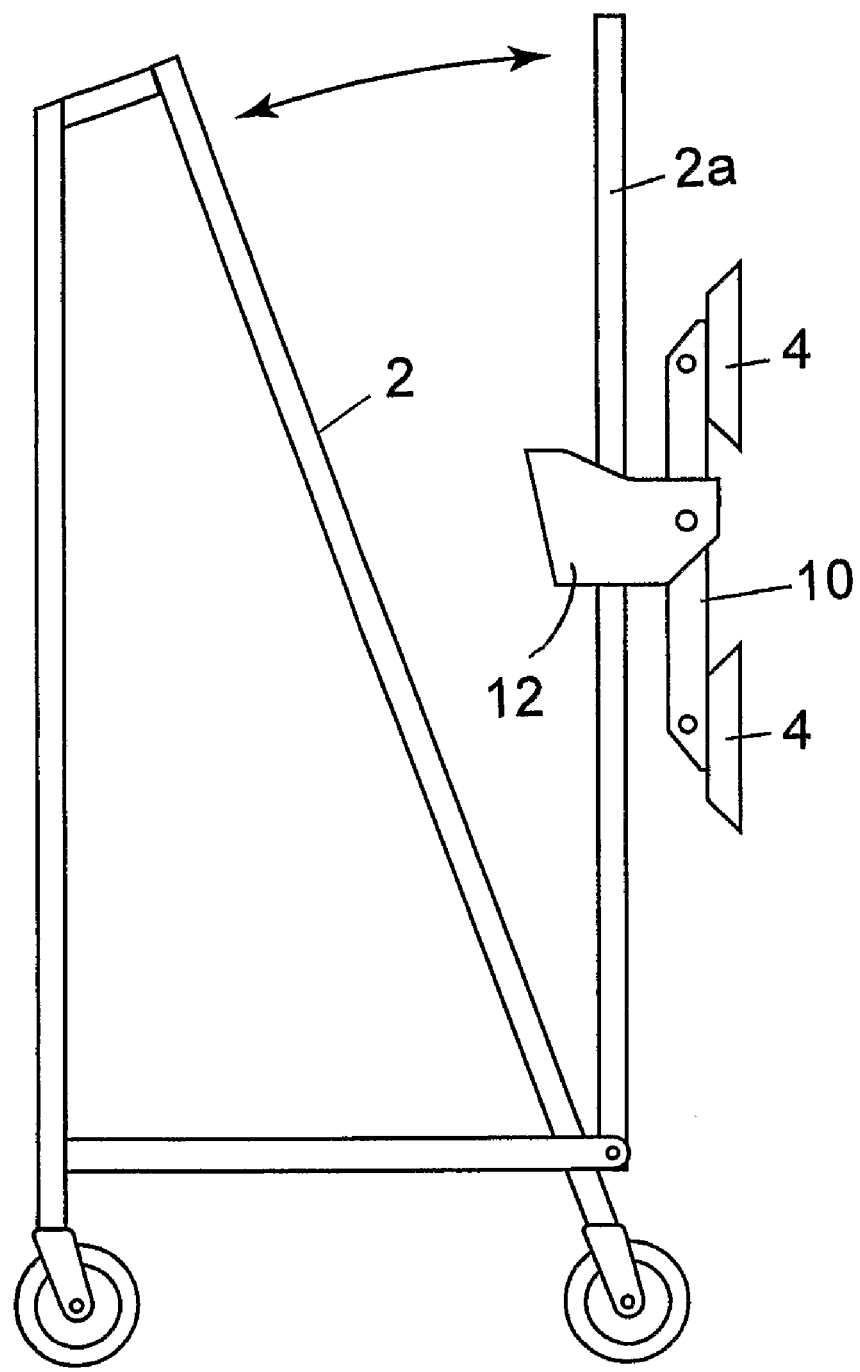
FIG. 6 is a schematic side view showing a modified form of trolley.

In the version described thus far, the front support shaft 2 is rearwardly inclined and the trolley is tilted forwardly to achieve vertical orientation of the sheet. In the version shown in FIG. 6, the carriage 12 is moveable along a secondary support shaft 2a pivotally mounted at its lower end to the frame for movement between a normal position in which it is rearwardly inclined, with a releasable lock being provided to secure the secondary shaft in that position, and a forward vertical position as shown in FIG. 6. This movement of the secondary shaft 2a relative to the main frame of the trolley can be effected either manually, or, as is preferred, by a mechanical drive system between the main frame and the secondary shaft. This arrangement not only facilitates loading of the glass sheet onto the trolley from a vertical or near vertical orientation but also unloading from the trolley, particularly during an installation procedure in which the glass needs to be maneuvered into a substantially vertical orientation, while avoiding the need to tilt the trolley.

In FIGS. 1, 4 and 5 the bracing between the two trolleys is shown in a form in which it can be releasably coupled between the two trolleys and for some applications, depending on the size of the sheet, may not be required to be used. This form of bracing is principally designed for use in situations where the two trolleys are transported individually such as on a small truck which also carries sheets of glass for delivery to a customer so that the trolleys can be used at the delivery site. For use in a factory situation where it is not necessary to transport the two trolleys individually, the two trolleys may be permanently coupled by bracing such as Z-bracing of the form shown; in that case it may not be necessary for the bracing to be adjustable in length although such adjustability can be provided if needed. For use in a factory situation where considerations as to trolley weight are not so critical, the overall system may be power-driven for example by driving one set of trolley wheels via a battery-powered drive motor carried by that trolley. In that case the driven wheels would not themselves be castor wheels, but non-driven castor wheels would still be provided on the other trolley. It is however to be understood that a power drive is not essential for a factory situation and significant utility is envisaged for such a version which is moved simply by manual operation.

Figure 7:
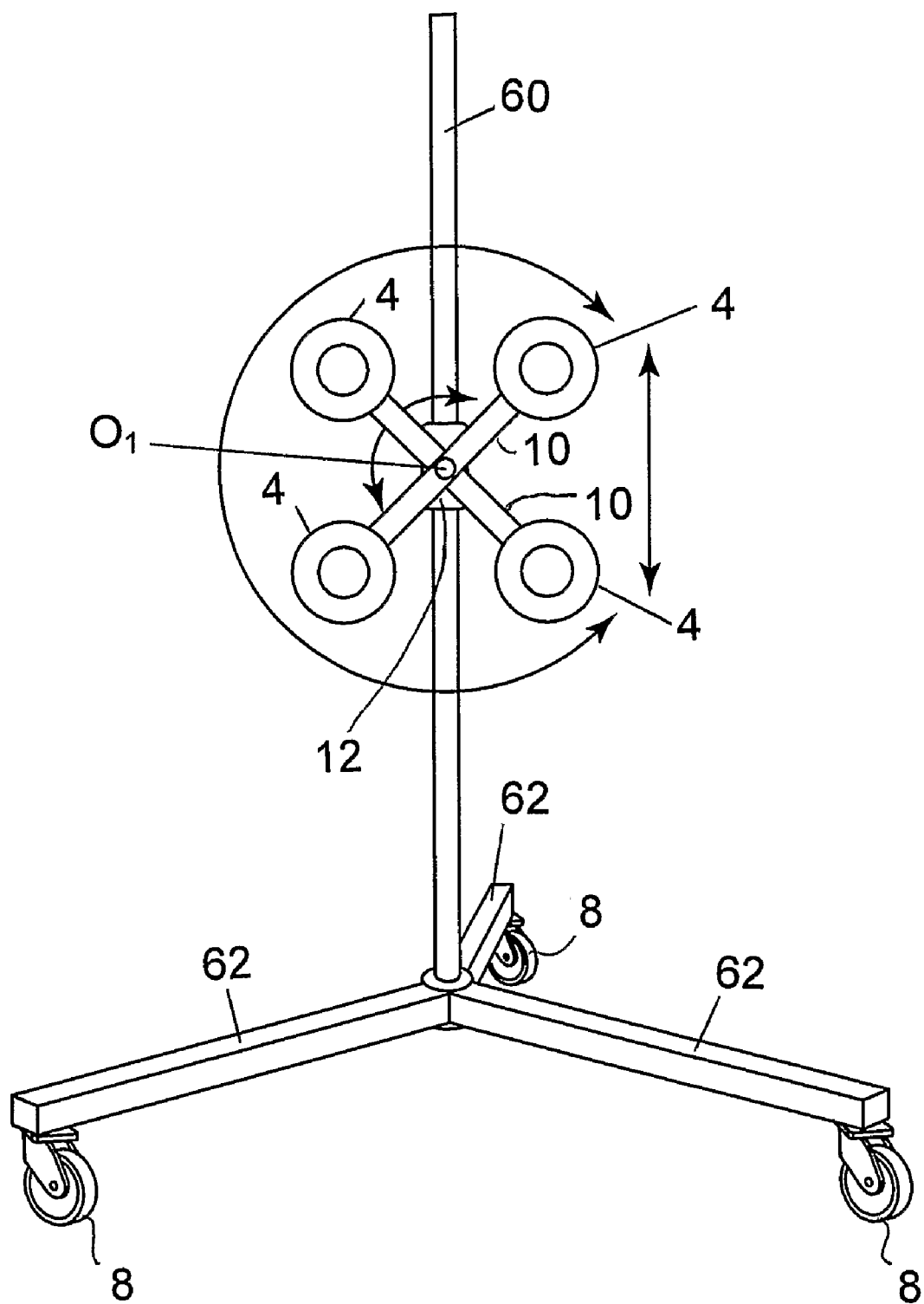
FIG. 7 is a schematic front view of an alternative form of trolley which is able to be used without the need for a second trolley.

FIG. 7 shows a version of the trolley with a single vertical support shaft or mast 60 attached to a base which in the form shown consists of three radial arms 62 having castor wheels 8. The mast 60 carries four vacuum grips 4 mounted on a single carriage 12 by pairs of support arms 10. The arms 10 can be rotated about a central horizontal axis $O_1$ and can be locked in any selected angular position to permit adjustment in sheet orientation relative to the trolley. The mast 60 may be adjustable in inclination relative to the base to facilitate attachment and retrieval of a sheet from a truck or the like during loading. For ease of transportation and stowage of the trolley when not in use, the arms 62 forming the base can be folded upwardly to lie adjacent the mast 46 and the two arms 10 carrying the vacuum grips 4 can be swung into a contracted orientation in which the two arms and their associated grips lie approximately side by side.

Movement of the carriage 12 along the mast 60 can be achieved by a simple winch system or other mechanical adjustment systems such as has been described in our earlier International patent application.

This form of trolley is of particular value when it is required to achieve a significant change in orientation of the sheet from that in which it is picked up from one position such as on a delivery truck to its orientation for its required usage, for example a 90° or even a 180° change. It is envisaged that this form of trolley will usually be used on its own rather than in conjunction with a second trolley. This form of trolley will also have utility for use on its own with smaller sized sheets, and for applications where a change in sheet orientation is not envisaged, the facility for rotation about the axis $O_1$ can be omitted.

Figure 8:
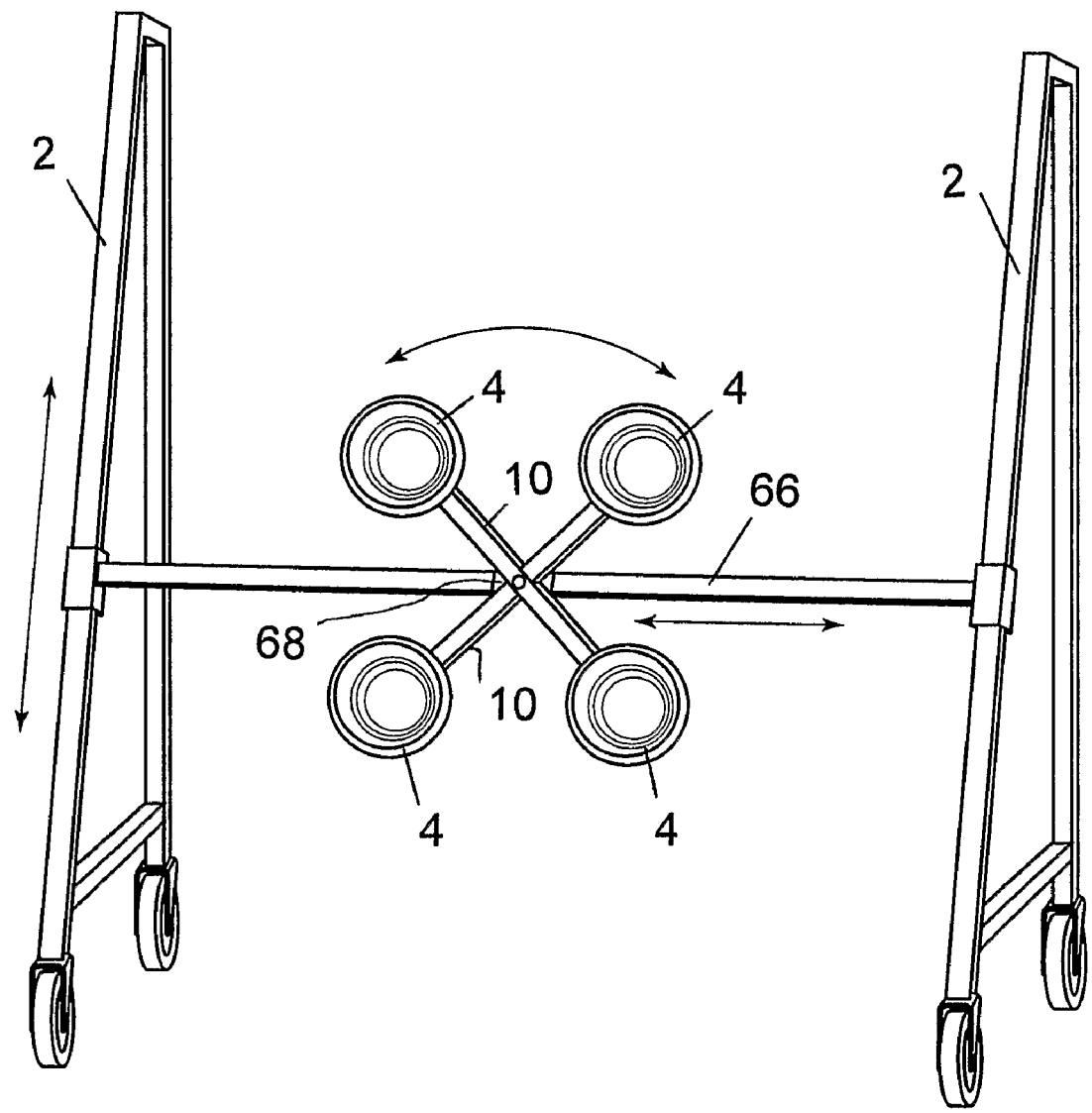
FIG. 8 is a perspective view from the front showing schematically two trolleys with an alternative vacuum grip configuration.

Another version which can achieve the change in orientation just described is shown highly schematically in FIG. 8 in which two trolleys are coupled by a horizontal bar 66 which is able to move along the front shaft 2 of the two trolleys for example using a winch system as previously described or using other adjustment systems as described in our earlier International patent application. The rotatable arms 10 carrying the vacuum grips 4 are mounted to a carriage 68 which is movable along the length of the bar 66 whereby the orientation and lateral position of the sheet is adjustable relative to the two trolleys.

In practice, it is preferred that the version of FIG. 8 is used as an accessory in conjunction with two trolleys of the form shown in FIG. 1. The bar 66 is releasably fastened at each end to the grip carriages 12 of the two trolleys while the normal grips 4 are still present, and in that case the rotary array of grips carried by the bar 66 will extend forwardly of the other grips. Alternatively the vacuum grips and possibly their support arm 10 can be removed from one of the carriages 12 with their function assumed during normal operation by displacing the rotary array of grips shown in FIG. 8 to the corresponding end of the bar 66. When the specialist operation of change in sheet orientation is required, the rotary array of grips is then displaced into a more central position between the two trolleys as generally illustrated in FIG. 8.

Figure 9:
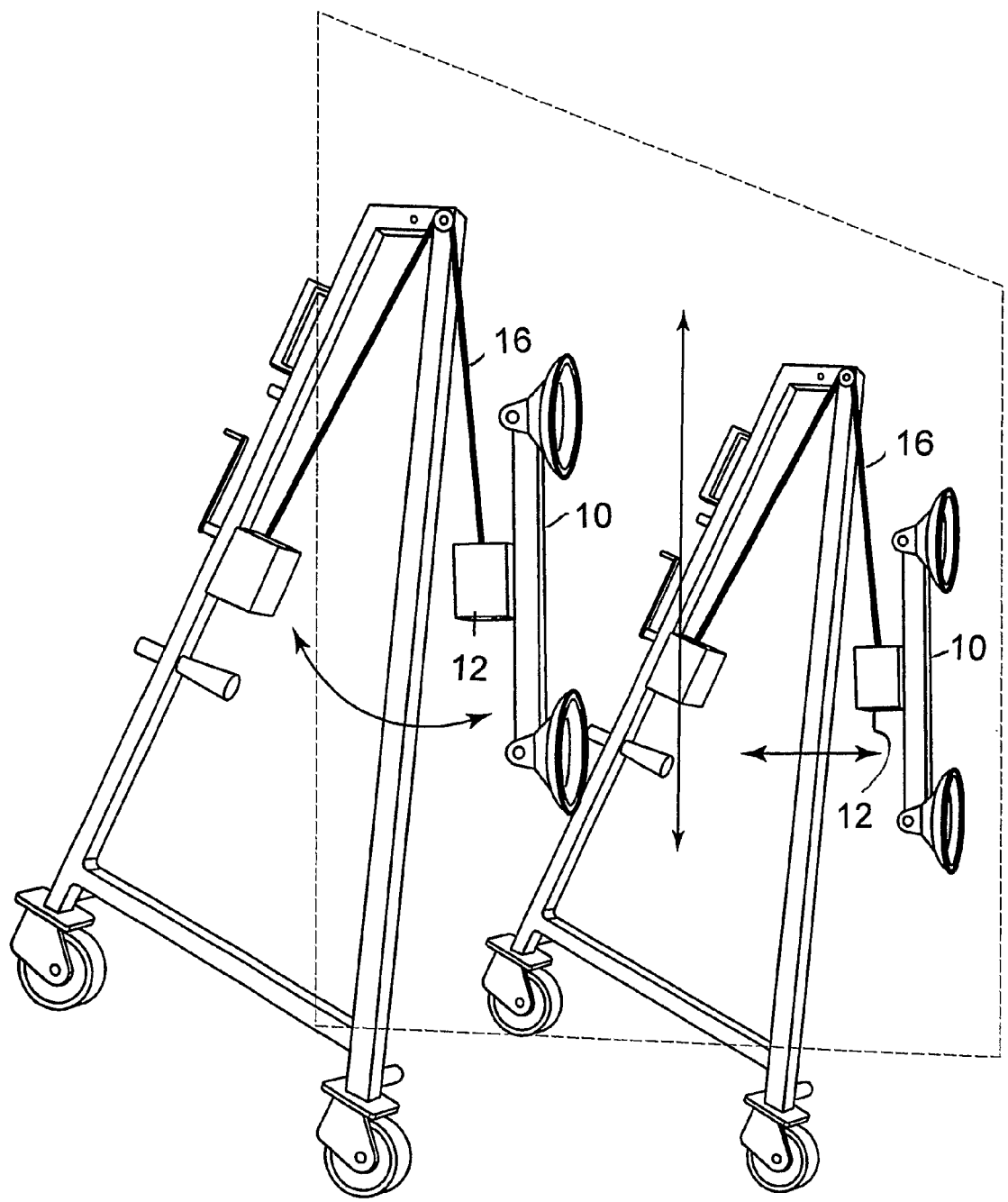
FIG. 9 is a front perspective view showing schematically an alternative configuration in which the vacuum grip carriages are able to be detached from the upright support shaft of the trolleys to permit the glass sheet to hang freely during installation.

FIG. 9 shows an arrangement in which the carriages 12 are constructed so as to be releasable from the front shaft 2 during use. If the two trolleys are then tilted forwardly (as actually shown in FIG. 9), the glass sheet will hang vertically while freely suspended by the winch cables 16. In this mode, the glass sheet held by the vacuum grips 4 is thereby "floating" and this permits easier manipulation of the glass for installation purposes.

Figure 10:
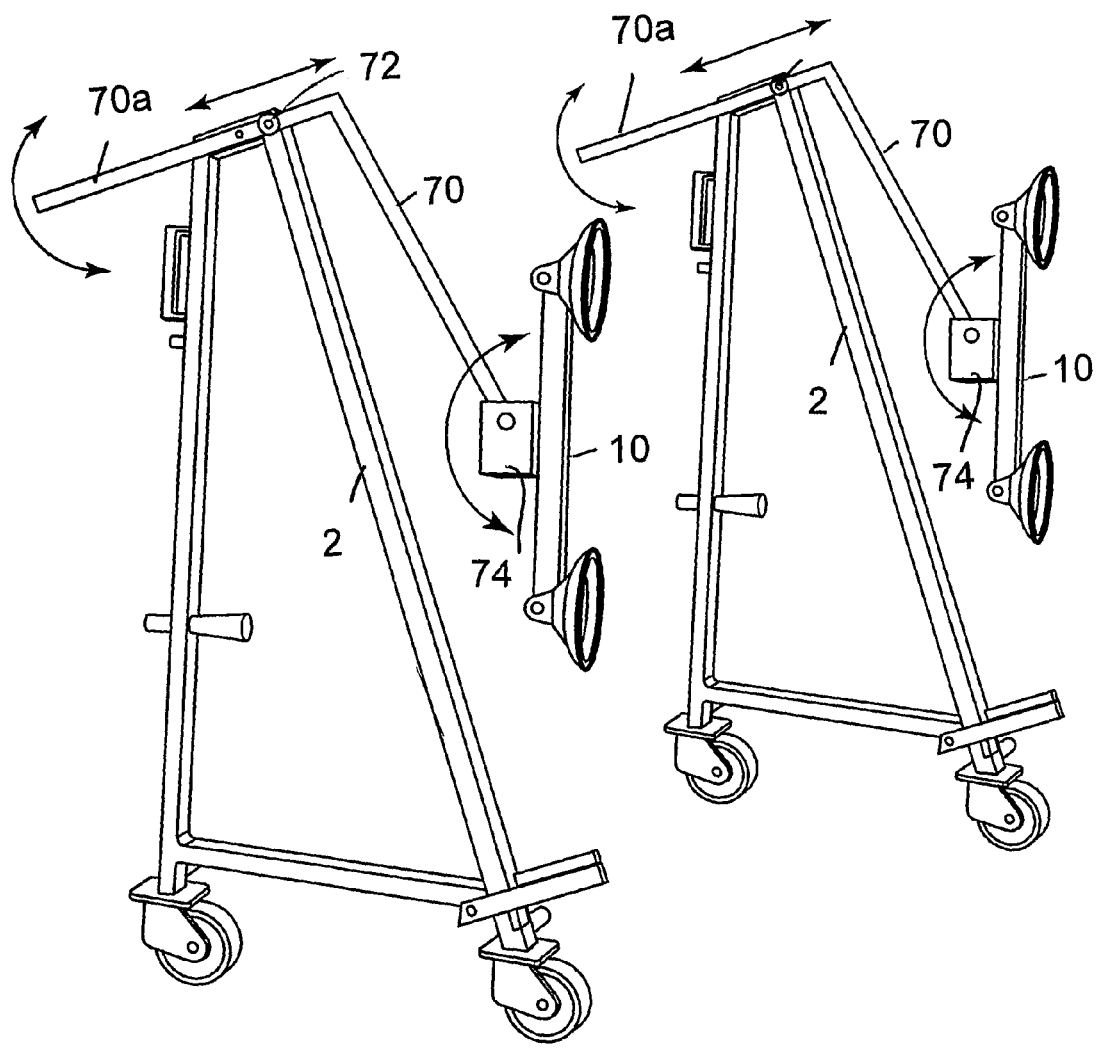
FIG. 10 is a front perspective view showing schematically an alternative configuration for mounting the vacuum grips to the trolleys.

FIG. 10 shows a version in which the arm 10 carrying the vacuum grips 4 is mounted at the lower end of a lever arm 70 mounted by a pivot 72 to the top of the trolley frame for swinging movement about a horizontal axis. An extension 70a of the lever arm 70 rearwardly of the pivot 72 provides a handle by which the lever arm 70 can be swung and thereby manipulated. The arm 10 is connected to the lower end of the lever arm 70 by a mounting 74 which is able to pivot about a horizontal axis relative to the lever arm 70 to enable the arm 10 and the grips 4 carried thereby to swing in a fore-aft direction. The arm 10 may itself be rigidly fixed relative to the mounting 74 or can be pivotally mounted as described in relation to its mounting on the carriage 12.

For transportation of the glass sheet, the mounting 74 will be releasably retained to the front shaft 2. For loading of the glass and for manipulation of the glass during unloading and installation, the mounting 74 is released from the trolley and the handles 64a are moved to manipulate the glass. This is a relatively simple arrangement which provides the possibility only of limited vertical movement of the glass during installation but there are some situations where this limited movement is all that is necessary. Accordingly this provides a lower-cost solution than that involving the use of a winch or other system which provides for extensive vertical adjustment during installation.

Thus far the invention has been described with reference to the use of vacuum grips which will be present when single sheets are being transported which is the principal intended use for this invention. Each vacuum grip is actuated by manually operated vacuum pump as described in our earlier application or by another mechanical actuation system; alternatively an electrically driven vacuum pump can be incorporated for that purpose. However the invention also has applicability for the transportation of stacks of sheets held upright in face-to-face relation. In that case instead of vacuum grips, each trolley will carry individual upper and lower brackets of angled form moveable along the front shaft so that the upper and lower edges of the stack can be held captive between the pairs of brackets. The stack can thereby also be raised and lowered relative to the trolleys as required.

A trolley as previously described can be converted to incorporate this facility by removing the vacuum grips from the mounting plates 26 on the arm 10. A lower support bracket can be mounted to the lower plate 26. An assembly consisting of a vertical support post and upper bracket is attached to the upper mounting plate 26. The upper bracket is slidably mounted on the support post so that when the stack of sheets has been loaded onto the lower bracket with the upper bracket in an elevated position, the upper bracket can then be slid downwardly along the post to engage and thereby retain the upper edges of the stack of sheets. It will be understood that although an existing trolley can readily be converted as just described, alternatively a trolley can be supplied to a user just with the brackets when only that application is required by the user.

Although certain of the modifications and improvements have been described with reference to different versions of the trolley, it is to be understood that most of these can actually be incorporated into a single version of the trolley, if required.

Figure 11:
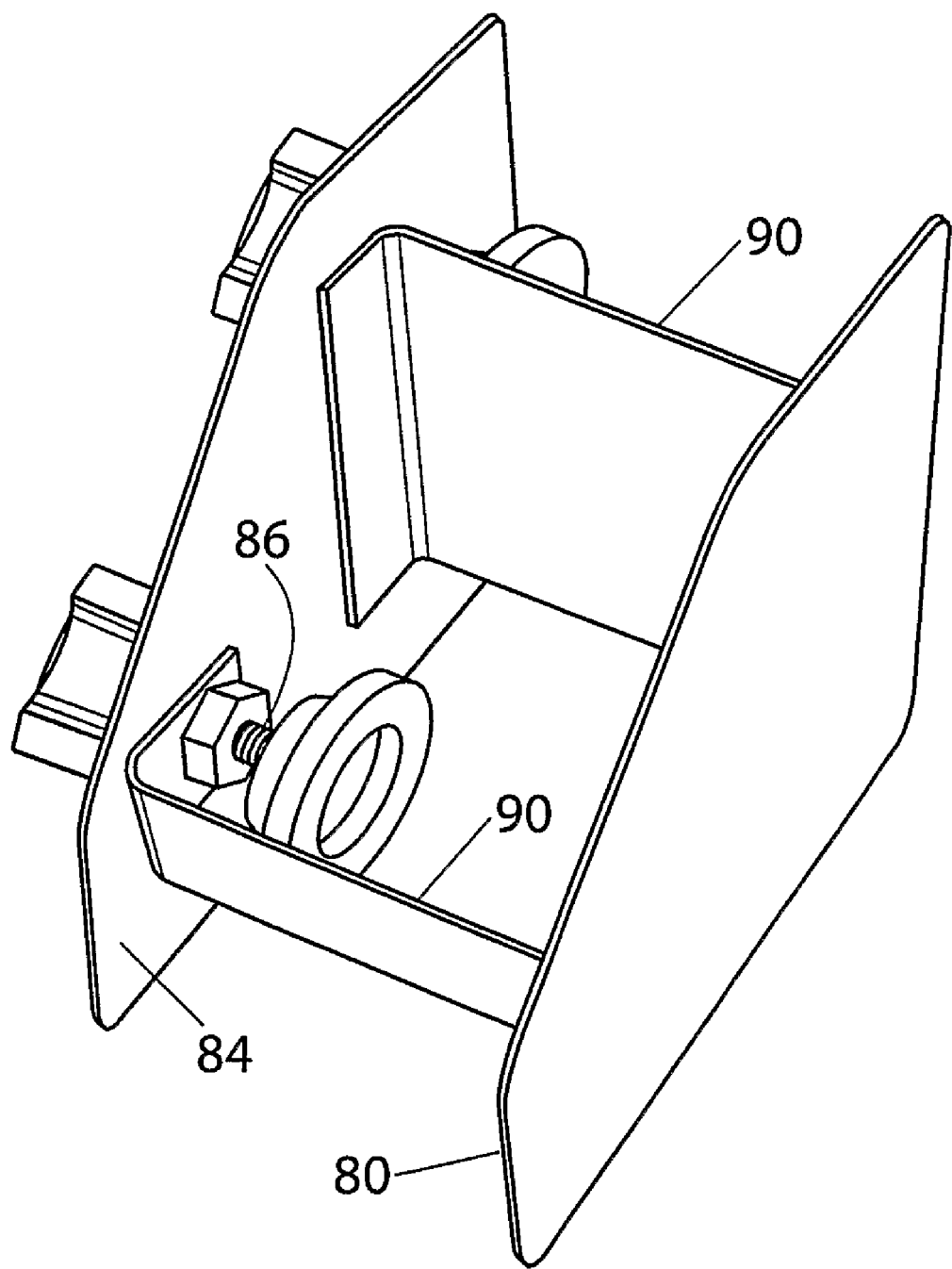
FIGS. 11 and 12 are perspective views of a glass installation guide.
Figure 12:
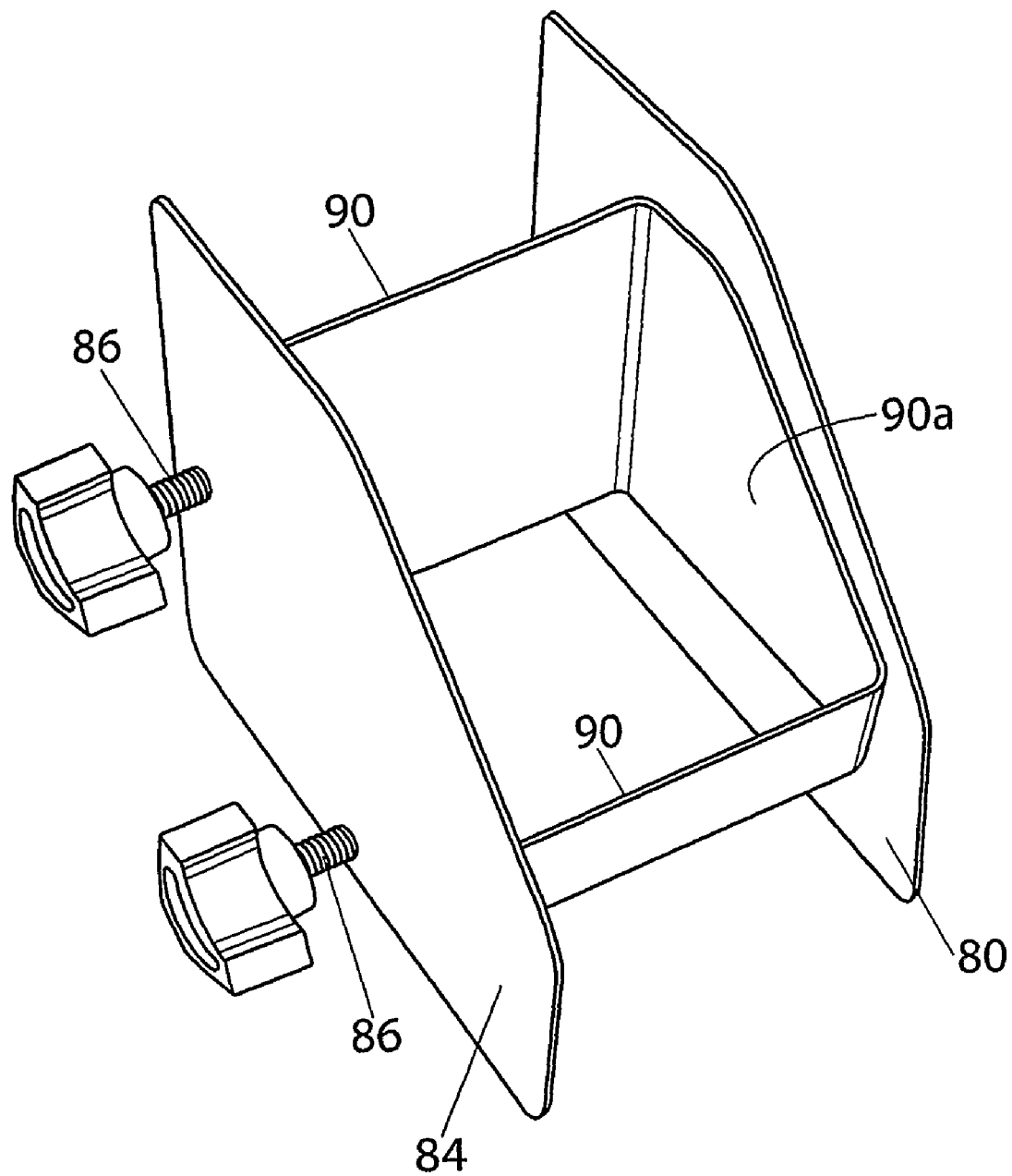
Figure 13:
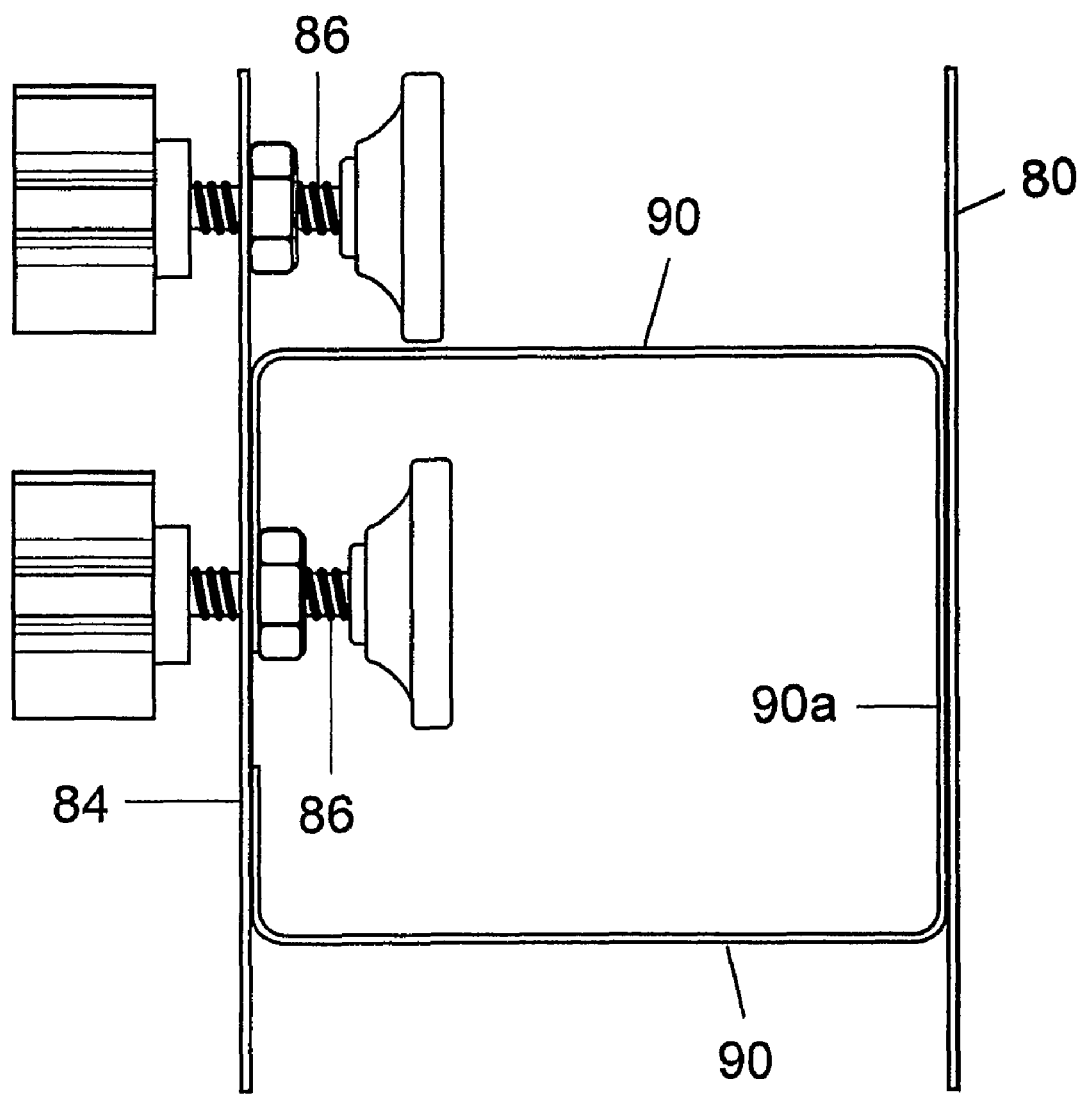
FIG. 13 is a plan view of the installation guide.
Figure 14:
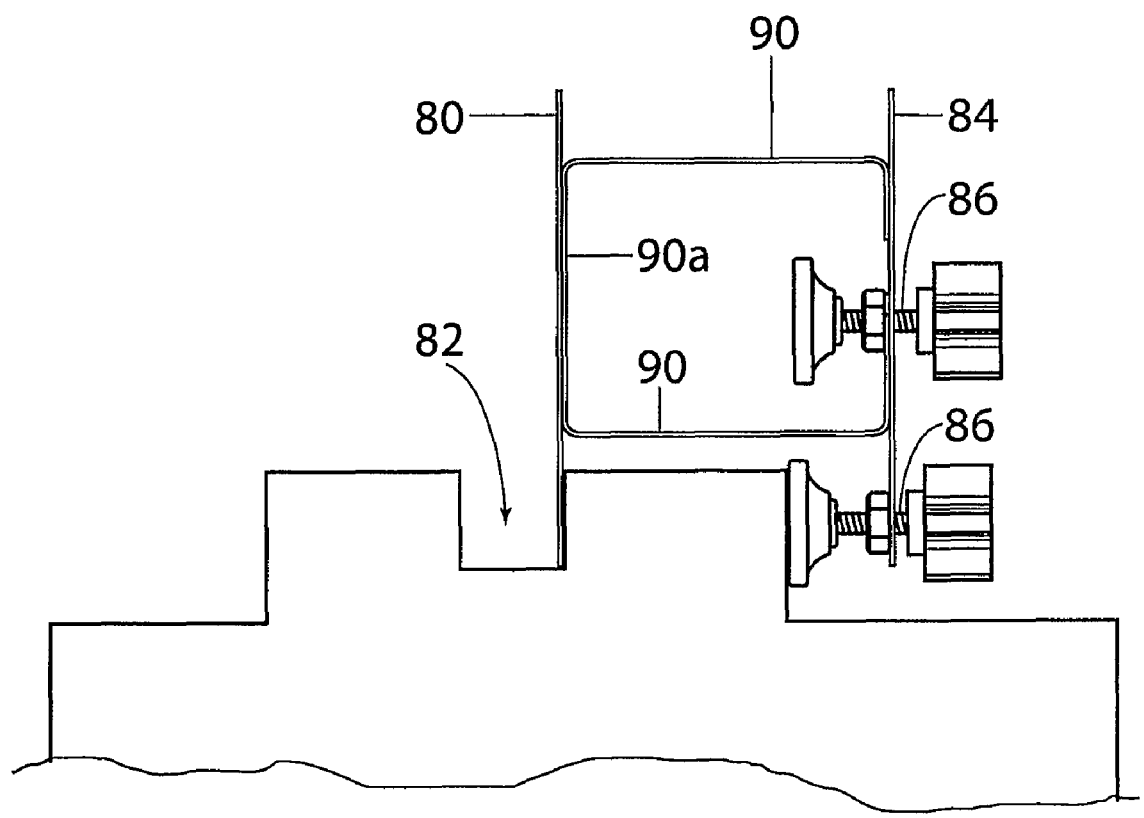
FIG. 14 is a view illustrating the manner in which the guide is applied to a frame.

FIGS. 11 to 13 show a glass installation guide and FIG. 14 shows the guide mounted to the window frame. This guide is not only of benefit when installing glass by glass handling devices as described herein but also it is of benefit when installing glass by more traditional methods. The guide consists of a plate 80 which is clamped to the inside face of the channel 82 in the frame into which the glass is to be installed. By "inside" in this context is meant that side which faces the direction in which the glass is installed into the frame. The plate 80 has a substantial projection from the frame and provides a substantial bearing surface against which the inside surface of the glass will bear and thereby be located so that the glass will be accurately aligned relative to the channel 82 and can therefore be manipulated into the channel. Typically, one such guide will be installed at each corner portion of the frame and also at an intermediate position along each of the upright and horizontal members of the frame. In this way, the guides not only facilitate installation of the glass into the frame, but also depending on the size of the glass sheet they can enable installation to be performed by one person only. Using conventional methods, installation normally requires two persons, one manipulating the glass from the outside and the second working from the inside to prevent the glass from being pushed through the frame during installation.

The guide plate 80 is relatively thin so that even when it is within the channel 82 the glass can still be inserted into the channel and for this purpose the plate 80 is made from a suitable metal such as stainless steel or aluminium. A thin layer of a protective material to engage the surface of the glass sheet may be applied to the outer surface of the plate 80. A second plate 84 parallel to the guide plate 80 and adapted to lie at the inside of the window carries one, and preferably two clamping screws 86 by which the guide can be clamped against the frame. As best shown in FIG. 13, the two clamping screws 86 are adjacent two sides of the plate at right angles one to the other, for use in a situation where the guide is inserted into a corner portion of the frame in which case both of the clamping screws 86 can be tightened to secure the guide in position against the adjacent horizontal and upright members, with the edges of the guide plate engaged the channel of the two frame members. When the guide is located midway along a horizontal or upright member of the frame, just one of the clamping screws 86 will be tightened to secure the guide.

The two plates 80, 84 are interconnected by cross bracing. As shown, both plates are made out of relatively thin metal sheet and the cross bracing tends to rigidify the structure. In the particular form shown, the cross bracing is itself formed from a single folded metal sheet 90 of similar thickness and spot welded to the inside surfaces of the two plates 80, 84. The bracing sheet 90 is, as shown, so shaped that a part 90a thereof has a large surface area in contact with the inner surface of the guide plate 80 so as to add to the rigidity of the guide plate 80 in the portion thereof which lies outside of the channel 82 in the window frame. The bracing structure between the two plates 80, 84 could be of other form to that shown; for example substantial rigidity could be provided by increasing the thickness of the inside plate 84 with the thinner guide plate 80 which fits into the channel 82 being supported from the inner plate by transverse struts of sufficient rigidity to provide a substantially rigid support for that plate.

The sheet handling system using one, or more normally two, of the trolleys described significantly facilitates handling of large sheets and, in the case of glass sheets, their installation into a frame such as may be incorporated in a shop front or similar. Not only does it enable a significant reduction in personnel costs it should also lead to a significant reduction in work place injuries which are particularly prevalent in the glazing industry.

The embodiments have been described by way of example only and modifications are possible to the detailed arrangements disclosed.

The invention claimed is:

1. A sheet handling device for handling glass and other sheet material, the device comprising wheels for movement of the device along the ground, opposed upright supports in parallel relationship, a carriage moveable along each support to a selected height, an assembly of at least two vacuum grips mounted to the carriage to engage the sheet at positions displaced in the height direction of the sheet, the grip assembly being mounted to the carriage in a manner configured to permit pivotal movement of the assembly about an axis perpendicular to the plane of a sheet material carried by the grips, the upright supports being configured to permit parallel pivotal movement from a substantially vertical orientation in the device to an inclined orientation in a direction in which the sheet material carried by the vacuum grips will be subject to sideways displacement in the plane of the sheet material, such displacement being accompanied by pivotal movement of each vacuum grip assembly about said axis, and a strut linking the two upright supports, the strut being adjustable to effect said movement of the supports to the inclined orientation so to displace the sheet material sideways.

2. A device according to claim 1, wherein each vacuum grip assembly comprises a respective vacuum grip mounted at each end of an arm which is mounted to the carriage for pivotal movement about said axis.

3. A sheet handling device according to claim 2, wherein the arm is pivotal into a selected position about said axis.

4. A sheet handling device according to claim 2, wherein the arm is selectively lockable against rotation about said axis.

5. A sheet handling device according to claim 2, wherein the arm is mounted to the carriage for pivotal movement about a generally horizontal axis to accommodate a change in the orientation of the plane of the sheet relative to the vertical.

6. A sheet handling device according to claim 5, wherein the arm is mounted to the carriage by a pivot arrangement comprising a horizontal pin which defines said horizontal axis and a resilient bush mounted on the pin and which is deformable to permit pivotal movement of the arm through a restricted angle about the axis perpendicular to the plane of the sheet.

7. A device according to claim 1, consisting of two opposed wheeled trolleys, each including a respective one of the upright supports, and the two trolleys are linked by the adjustable strut.

8. A device according to claim 7, wherein the trolleys are interconnected by bracing struts comprising upper and lower bracing struts extending substantially horizontally between the two trolleys, and the adjustable strut is a diagonal bracing strut extending from an upper end of one of the trolleys to a lower end of the other trolley.

9. A device according to claim 8, wherein the diagonal bracing strut consists of two telescopic sections interconnected by a left hand and right hand threaded coupling whereby by rotation of the coupling the overall length of the brace can be extended or reduced in a gradual manner to provide fine-controlled sideways displacement of the sheet material in its own plane.

10. A device according to claim 8, wherein the upper and lower bracing struts are of telescopic construction to permit variation of the spacing between the two opposed trolleys for accommodation of different widths of sheet material.

11. A device according to claim 8, wherein the struts are releasable to permit separation of the two trolleys.

12. A sheet handling system according to claim 8, wherein the bracing struts are adjustable in length in order to locate the two trolleys at a variable distance.

13. A sheet handling system according to claim 8, wherein each bracing strut is releasably attachable to one of the trolleys and when released from that trolley can be swung into a storage position on the other trolley.

14. A sheet handling system according to claim 8, wherein the diagonal bracing strut has means for extending its length by rotation of a screw coupling while the bracing is in situ between the two trolleys, and each of the struts is pivotally connected to the two trolleys so that length extension of the diagonal brace while in situ will result in the two trolleys inclining in a parallel fashion.

15. A sheet handling device according to claim 1, wherein the carriage is coupled to a winch cable for controlled movement upwardly and downwardly along the support.

16. A sheet handling device according to claim 1, having a sheet support at an upper end of the support shaft to provide support for an upper part of the sheet.

17. A sheet handling device according to claim 16, wherein the sheet support is moveable into a variable position beyond the upper end of the support shaft.

18. A sheet handling device according to claim 17, wherein the support is telescopically mounted within the support shaft and includes a roller for engaging a rear face of the sheet.

* * * * *

UNITED STATES PATENT AND TRADEMARK OFFICE
CERTIFICATE OF CORRECTION

| | | |
|---|---|---|
| PATENT NO. | : 7,997,845 B2 | Page 1 of 1 |
| APPLICATION NO. | : 11/579565 | |
| DATED | : August 16, 2011 | |
| INVENTOR(S) | : Ricardo Carlei | |

It is certified that error appears in the above-identified patent and that said Letters Patent is hereby corrected as shown below:

On Page 1, at (22), under PCT Filed, change "May 5, 2004" to --May 5, 2005--.

Signed and Sealed this
Ninth Day of October, 2012

David J. Kappos
*Director of the United States Patent and Trademark Office*